United States Patent
Fey

(10) Patent No.: US 11,293,322 B2
(45) Date of Patent: Apr. 5, 2022

(54) METHOD OF RECOGNIZING DEACTIVATION OF AN EXHAUST GAS CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/003,132

(22) Filed: Aug. 26, 2020

(65) Prior Publication Data
US 2021/0062699 A1 Mar. 4, 2021

(30) Foreign Application Priority Data

Aug. 28, 2019 (DE) ...................... 10 2019 212 899.8

(51) Int. Cl.
| | | |
|---|---|---|
| *F01N 3/00* | (2006.01) | |
| *F01N 3/20* | (2006.01) | |
| *F02D 41/14* | (2006.01) | |
| *F02D 41/02* | (2006.01) | |

(52) U.S. Cl.
CPC ........... *F01N 3/20* (2013.01); *F02D 41/0235* (2013.01); *F02D 41/1454* (2013.01)

(58) Field of Classification Search
CPC .............. F01N 3/20; F01N 2900/0406; F01N 2560/025; F01N 11/00; F02D 41/1454; F02D 41/0235; F02D 2200/0814
See application file for complete search history.

(56) References Cited

U.S. PATENT DOCUMENTS

| | | | | |
|---|---|---|---|---|
| 2004/0168430 | A1* | 9/2004 | Mazur ................... | F01N 11/007 60/277 |
| 2005/0072138 | A1* | 4/2005 | White ................. | F02D 41/1487 60/285 |
| 2008/0173008 | A1* | 7/2008 | Kidokoro .............. | F01N 11/007 60/277 |
| 2011/0225951 | A1* | 9/2011 | Sato ...................... | F02D 41/222 60/274 |
| 2012/0031170 | A1* | 2/2012 | Matsumoto ......... | F02D 41/1454 73/30.01 |
| 2015/0316002 | A1* | 11/2015 | Pursifull ................. | F02D 41/08 123/339.12 |
| 2019/0309698 | A1* | 10/2019 | Eckart ................. | F02D 41/0295 |

FOREIGN PATENT DOCUMENTS

| | | | |
|---|---|---|---|
| DE | 102006061684 | 7/2008 | |
| DE | 102016121155 | 7/2017 | |
| WO | WO-2018091252 A1 * | 5/2018 | ......... F02D 41/0295 |

* cited by examiner

*Primary Examiner* — Matthew T Largi
(74) *Attorney, Agent, or Firm* — Michael Best & Friedrich LLP

(57) ABSTRACT

A method of recognizing deactivation of an exhaust gas catalytic converter is disclosed. For this purpose, coverage of storage sites of the exhaust gas catalytic converter with rich gas components is modeled (60) and the deactivation is recognized from a proportion of the occupied storage sites in a total number of storage sites.

9 Claims, 2 Drawing Sheets

METHOD OF RECOGNIZING DEACTIVATION OF AN EXHAUST GAS CATALYTIC CONVERTER

BACKGROUND OF THE INVENTION

The present invention relates to a method of recognizing deactivation of an exhaust gas catalytic converter. The present invention further relates to a computer program that executes every step of the method, and to a machine-readable storage medium that stores the computer program. Finally, the invention relates to an electronic control device set up to execute the method.

In the event of incomplete combustion of the air-fuel mixture in a gasoline engine, as well as nitrogen, carbon dioxide and water, a multitude of combustion products are emitted, of which hydrocarbons, carbon monoxide and nitrogen oxides are subject to legal limits. Since these limited combustion products occur to an enhanced degree in the case of a rich air-fuel mixture in particular, they are also referred to as rich gas components. For compliance with the applicable exhaust gas limits for motor vehicles, a three-way catalytic converter is used to convert these rich gas components to harmless combustion products.

A simultaneously high conversion rate for hydrocarbons, carbon monoxide and nitrogen oxides is achieved in three-way catalytic converters only within a narrow lambda range around a stoichiometric operating point (lambda=1), called the catalytic converter window. In this catalytic converter window, the catalytic converter can both store oxygen and hence reduce nitrogen oxides, and release stored oxygen and hence oxidize hydrocarbons and carbon monoxide.

The number of storage sites on the catalytic converter that are available for the storage of oxygen can be reduced in that the storage sites are occupied by rich gas components, especially by carbon monoxide. The increasing occupation of storage sites by rich gas components leads to an ever decreasing oxygen storage capacity and hence to an ever poorer conversion performance of the catalytic converter and elevated pollutant emissions. This effect is referred to as catalytic converter deactivation. The catalytic converter deactivation generally alters the exhaust gas composition downstream of the catalytic converter. Owing to different cross-sensitivities of the lambda probe to individual exhaust gas components, this leads to a distorted lambda signal of the lambda probe downstream of the catalytic converter. Setpoint regulation on the basis of this distorted signal can lead to a further increase in emissions.

In order to prevent catalytic converter deactivation, DE 10 2006 061 684 A1 proposes modulating the oxygen content of the exhaust gas introduced into the catalytic converter in such a way that the catalytic converter is operated alternately with slightly rich lambda ($\lambda$<1) and slightly lean lambda ($\lambda$>1). There is no occurrence of elevated emissions here since the oxygen storage capacity of the catalytic converter is not fully exploited in this method. However, this does not assure avoidance of catalytic converter deactivation under all operating conditions.

Therefore, DE 10 2016 121 155 B3 proposes increasing the period duration and amplitude of the modulation in such a way that a reaction of the signal of a lambda probe downstream of the catalytic converter to the modulation becomes visible. It is then possible to recognize catalytic converter deactivation from a decreasing phase shift or delay time. However, the reaction of the signal of the lambda probe in driving operation may be superposed by other effects that are distinguishable therefrom only with difficulty, which make it more difficult or even impossible to reliably assess the phase shift or delay time. Moreover, this method leads to elevated emissions since the modulation amplitude and/or the period duration must at least temporarily be increased to such an extent that an exhaust gas lambda different from 1 occurs downstream of the catalytic converter.

SUMMARY OF THE INVENTION

In the method for recognition of deactivation of an exhaust gas catalytic converter, especially a three-way catalytic converter, occupation of storage sites of the exhaust gas catalytic converter with rich gas components is modeled. Deactivation is then recognized by proportion of the occupied storage sites in a total number of storage sites. One advantage of this model-based recognition of catalytic converter deactivation is that it is a purely passive method in which no active adjustment of the input lambda of the exhaust gas catalytic converter takes place. Therefore, there is no possibility of an increase in pollutant emissions as a result of the performance of this method. Since the signal of the lambda probe downstream of the exhaust gas catalytic converter is not required for the modeling, effects that would distort or influence the probe signal, for example cross-sensitivities, temperature dependence, dynamic interventions of the lambda regulation or the setpoint regulation, are of no significance. The method is therefore not reliant on ideal operating conditions, for example operation at a steady engine speed and load.

Preferably, the deactivation is recognized when the proportion exceeds a settable proportion threshold. Alternatively or additionally, the deactivation can preferably also be recognized when a gradient of the proportion, especially one that has been low-pass-filtered, exceeds a settable gradient threshold at least for a settable period of time. In this way, deactivation can be recognized on account of high occupation of the storage sites or on account of a rapid rise in occupation.

It is preferable that, in the modeling, adsorption of gaseous rich gas components such as, in particular, hydrocarbons and carbon monoxide at storage sites or oxidation of the adsorbed rich gas components is taken into account. As a result, both the occupation of the storage sites and renewed release by the rich gas components are included in the model. In a simplified embodiment of the model, it may be the case here that only carbon monoxide as the most common rich gas component is taken into account in the model.

It is further preferable that, in the modeling, occupation of storage sites of the exhaust gas catalytic converter with oxygen is taken into account. The basis of this is that the total number of unoccupied storage sites corresponds to the number of available storage sites reduced by the number of storage sites occupied by oxygen and the number of storage sites occupied by rich gas components.

In order to ascertain the occupation of storage sites of the exhaust gas catalytic converter with oxygen, it is preferable that adsorption of gaseous oxygen at the storage sites, oxidation of gaseous rich gas components with adsorbed oxygen, oxidation of gaseous hydrogen with adsorbed oxygen, and breakdown of gaseous water and adsorption of the oxygen released are taken into account. These chemical reactions determine the occupation and release of the storage sites with oxygen.

In order to obtain all the necessary input parameters for the modeling, it is preferable that, by means of an input emission model of the exhaust gas catalytic converter, proportions by mass of oxygen, hydrogen, water and rich gas components of the exhaust gas are ascertained upstream of the exhaust gas catalytic converter. This input emission model ascertains the proportions by mass especially from a signal of a lambda probe upstream of the exhaust gas catalytic converter. For example, the input emission model may consist of characteristics for the proportions by mass as a function of the exhaust gas lambda upstream of the exhaust gas catalytic converter.

In order to be able to realistically map filling and emptying operations in the exhaust gas catalytic converter, it is preferable that, in the modeling, the exhaust gas catalytic converter is divided into multiple axially successive zones. In each of these zones, it is then possible with the aid of the chemical reaction that proceeds in the exhaust gas catalytic converter to calculate the proportions by mass of the individual exhaust gas constituents and the resulting proportions of the storage sites occupied by rich gas components. The proportions of the storage sites occupied by rich gas components in individual or all zones can then be combined to give a total fill level of rich gas components that reflects the condition of the exhaust gas catalytic converter When catalytic converter deactivation has been recognized, measures for reactivation of the catalytic converter can be initiated. For this purpose, the catalytic converter can be purged, for example, with exhaust gas having a lean input lambda. The lean input lambda results in an excess of gaseous oxygen in the catalytic converter, with which the stored rich gas components can be oxidized. As a result, the storage sites occupied by the rich gas components are released again.

In order to be able to end the measure for reactivation of the catalytic converter in a controlled manner before there are elevated nitrogen oxide emissions, it is preferable that the occupation of the storage sites of the exhaust gas catalytic converter with rich gas components is modeled and observed during the reactivation as well. The measure for reactivation is then preferably ended when the proportion goes below a settable threshold value. It is further preferable that the measure for reactivation is ended immediately when a lambda probe downstream of the exhaust gas catalytic converter already indicates a breakthrough of lean exhaust gas beforehand.

The input parameters of the model of the storage site occupation and of the input emission model are subject to uncertainties. This is especially true of the signal of a lambda probe upstream of the exhaust gas catalytic converter. It is therefore preferable to undertake adaptation of the models. The basis used for this adaptation may be the signal of a lambda probe downstream of the exhaust gas catalytic converter.

The computer program is set up to perform every step of the method, especially when it is running on a computation unit or an electronic control device. It enables the implementation of different embodiments of the method on an electronic control device without having to make structural changes thereto. For this purpose, it is stored on the machine-readable storage medium. By running the computer program on a conventional electronic control device, the electronic control device set up to recognize deactivation of an exhaust gas catalytic converter by means of the method is obtained.

BRIEF DESCRIPTION OF THE DRAWINGS

One working example of the invention is shown in the drawings and is elucidated in detail in the description that follows.

DETAILED DESCRIPTION

Figure 1:
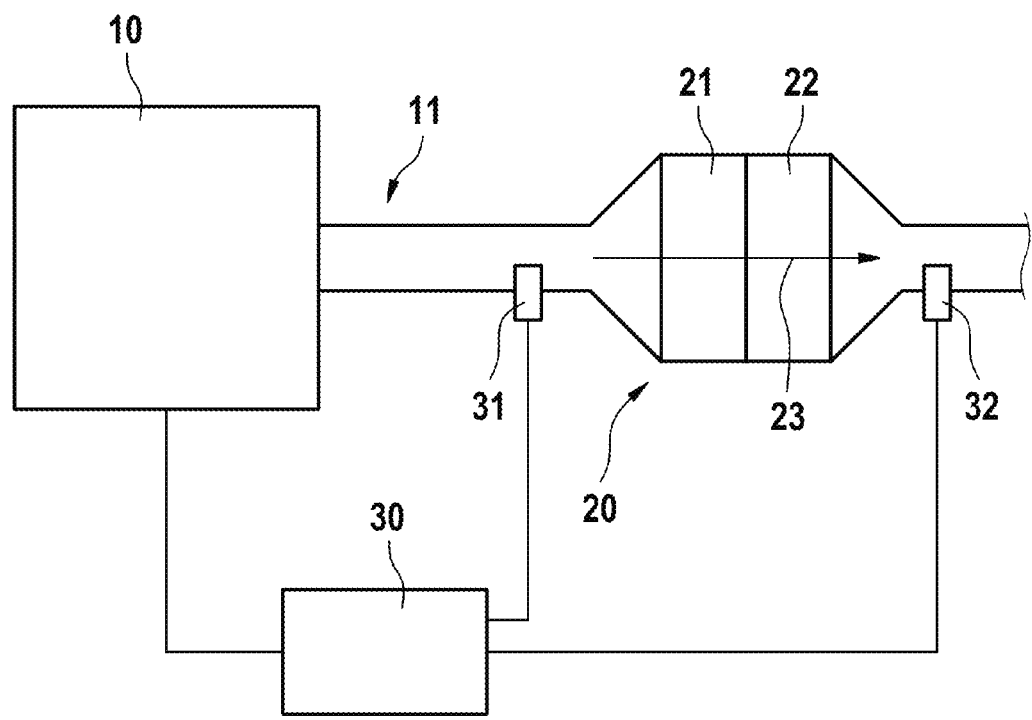
FIG. 1 shows a schematic of an exhaust gas catalytic converter, the deactivation of which can be recognized by means of a working example of the method according to the invention.
Figure 2:
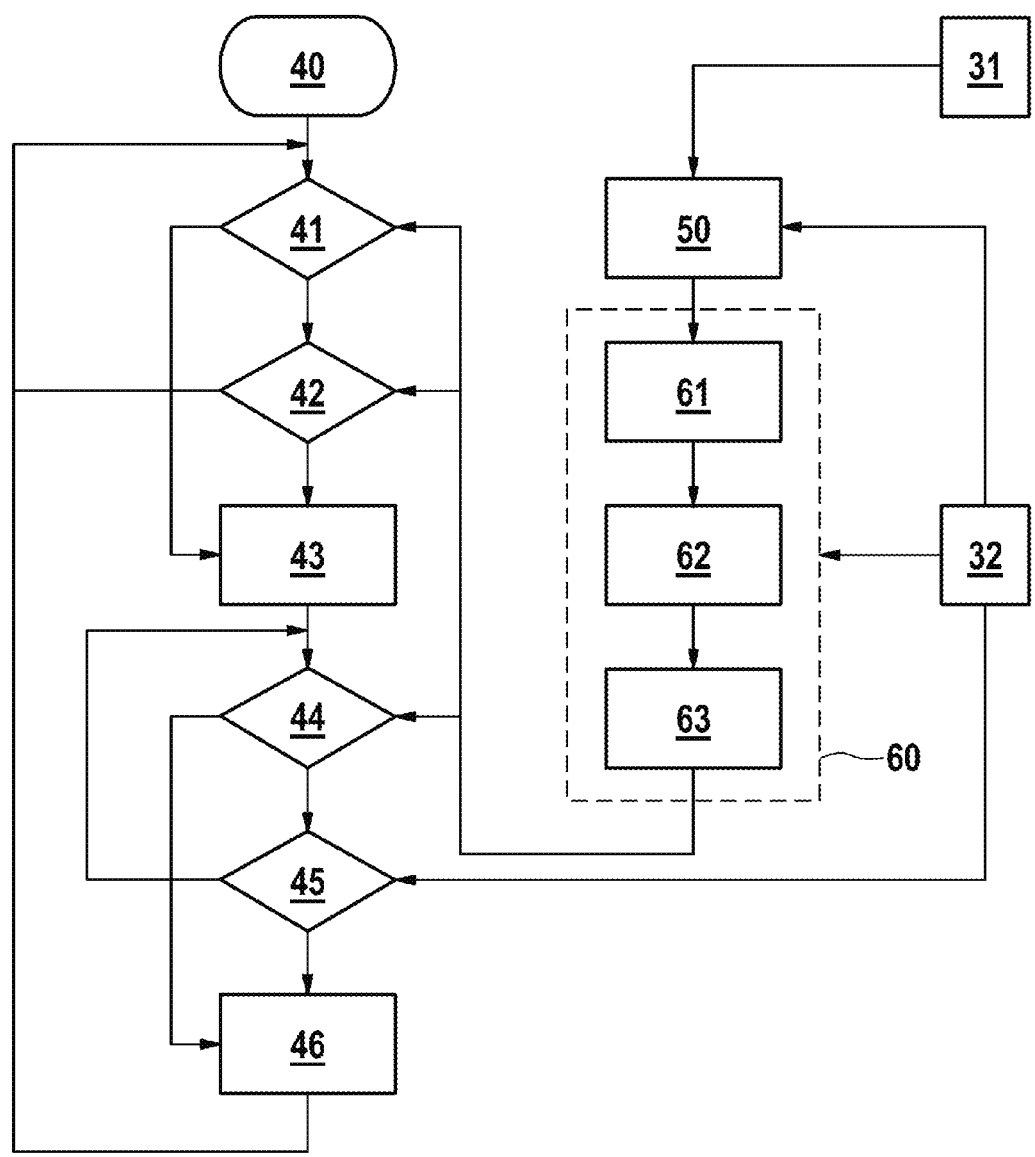
FIG. 2 shows a flow diagram of a working example of the method according to the invention.

An internal combustion engine 10, in the form of a gasoline engine, is shown in FIG. 1. This emits an exhaust gas in its exhaust gas conduit 11. In the exhaust gas conduit 11 there is disposed an exhaust gas catalytic converter 20 in the form of a three-way catalytic converter. In one working example of the method according to the invention, this is divided into two zones 21, 22 that follow successively along the longitudinal axis of the exhaust gas catalytic converter 20 in the direction of the exhaust gas stream 23. An electronic control device 30 controls the internal combustion engine 10. It receives sensor signals of a first lambda probe 31 which is arranged upstream of the exhaust gas catalytic converter 20 in the exhaust gas conduit 11, and a second lambda probe 32 which is arranged downstream of the exhaust gas catalytic converter 20.

After a start 40 of a working example of the method according to the invention, there is a test 41 as to whether a proportion of the storage sites of the exhaust gas catalytic converter 20 that is occupied by rich gas components exceeds a proportion threshold. This proportion threshold in the present working example is 20%. In addition, there is a test 42 as to whether a low-pass-filtered gradient of the proportion, at least for a settable period of time which, in the present working example, is two seconds, exceeds a gradient threshold which, in the present working example, is 2%/s. If the result of one of the two tests 41, 42 is that one of these conditions is satisfied, deactivation of the exhaust gas catalytic converter 20 is recognized 43 and a measure for reactivation thereof is initiated. For this purpose, the electronic control device 30 actuates the internal combustion engine 10 in such a way that it produces a lean exhaust gas. During this reactivation measure, two further tests 44, 45 run continuously. The third test 44 examines whether the occupation of the storage sites of the exhaust gas catalytic converter 20 with rich gas components has gone below a threshold which, in the present working example, is 5%. The fourth test 45 examines whether the second lambda probe 32 is indicating a lean exhaust gas having a lambda value of more than 1. If at least one of these two conditions is satisfied, the reactivation measure is ended 46, and the internal combustion engine 10 is actuated again according to its conventional operating strategy. Thereafter, the exhaust gas catalytic converter 20 is monitored again for deactivation by means of the first two tests 41, 42.

In order to ascertain the occupation of storage sites of the exhaust gas catalytic converter 20 with rich gas components, an input emission model 50 of the exhaust gas catalytic converter 20 is first created. The signal from the first lambda probe 31, by means of characteristics, is used to ascertain the proportions by mass $w_{O_2}$ of oxygen, $w_{H_2}$ of hydrogen, $w_{H_2O}$ of water, and the proportion by mass of the rich gas components. There follows a description of the modeling in simplified form solely with reference to the rich gas component carbon monoxide, and so only the proportion by mass $w_{CO}$ thereof from the input emission model is used. Using these proportions by mass, the occupation of the storage sites of the exhaust gas catalytic converter 20 with rich gas components is then modeled 60. This takes account of six chemical reactions. Gaseous oxygen $O_2$ is adsorbed at unoccupied storage sites * according to formula 1:

$$O_2 + 2[*] \xrightarrow{r_{O_2}^{ads}} 2[O] \qquad \text{(Formula 1)}$$

Adsorbed components are shown in square brackets in formula 1 and all subsequent formulae. The reaction rate $r_{O_2}^{ads}$ of the reaction according to formula 1 can be calculated according to formula 2:

$$r_{O_2}^{ads} = k_1 \cdot w_{O_2} \cdot \Theta_{[*]}^2 \qquad \text{(Formula 2)}$$

$k_1$ here denotes the collision factor (rate constant) of the reaction. Just like all the collision factors mentioned in the formulae that follow, this can be represented by an Arrhenius approach. $\Theta_{[*]}$ denotes the proportion of unoccupied storage sites. In all the formulae below, proportions of the storage sites are referred to as $\Theta_x$, where x may represent unoccupied storage sites ([*]); oxygen-occupied storage sites ([O]) or carbon monoxide-occupied storage sites ([CO]).

Gaseous carbon monoxide CO is oxidized with stored oxygen according to formula 3, where the reaction rate $r_{CO}$ thereof is a function of the collision factor $k_2$ of the reaction from formula 4:

$$CO + [O] \xrightarrow{r_{CO}} [*] + CO_2 \qquad \text{(Formula 3)}$$

$$r_{CO} = k_2 \cdot w_{CO} \cdot \Theta_{[O]} \qquad \text{(Formula 4)}$$

Gaseous hydrogen $H_2$ is oxidized with stored oxygen according to formula 5, where the reaction rate $r_{H_2}$ of this reaction is found as a function of its collision factor $k_3$ from formula 6:

$$H_2 + [O] \xrightarrow{r_{H_2}} [*] + H_2O \qquad \text{(Formula 5)}$$

$$r_{H_2} = k_3 \cdot w_{H_2} \cdot \Theta_{[O]} \qquad \text{(Formula 6)}$$

The breakdown of gaseous water and the adsorption of the oxygen released proceed according to formula 7, where the reaction rate $r_{H_2O}^{ads}$ of this reaction is found, taking account of its collision factor $k_4$, from formula 8:

$$H_2O + [*] \xrightarrow{r_{H_2O}^{ads}} [O] + H_2 \qquad \text{(Formula 7)}$$

$$r_{H_2O}^{ads} = k_4 \cdot w_{H_2O} \cdot \Theta_{[*]}^2 \qquad \text{(Formula 8)}$$

Gaseous carbon monoxide is adsorbed according to formula 9, where the reaction rate $r_{CO}^{ads}$ of this reaction is found with the collision factor $k_5$ from formula 10:

$$CO + \eta \, [*] \xrightarrow{r_{CO}^{ads}} [CO] \qquad \text{(Formula 9)}$$

$$r_{CO}^{ads} = k_5 \cdot w_{CO} \cdot \Theta_{[*]} \qquad \text{(Formula 10)}$$

Adsorbed carbon monoxide is oxidized with gaseous oxygen according to formula 11 with a reaction rate $r_{CO}^{oxi}$ which can be calculated taking account of the collision factor $k_6$:

$$[CO] + \frac{1}{2}O_2 \xrightarrow{r_{CO}^{oxi}} CO_2 + \eta[*] \qquad \text{(Formula 11)}$$

$$r_{CO}^{oxi} = k_6 \cdot w_{O_2} \cdot \Theta_{[CO]} \qquad \text{(Formula 12)}$$

Since carbon monoxide and other rich gas components can simultaneously occupy multiple storage sites, the number of occupied storage sites in the formulae 9 and 11 is denoted by $\eta$.

The formulae 1 to 12 result in the two coupled differential equations according to the formulae 13 and 14:

$$\frac{\partial \Theta_{[O]}}{\partial t} = 2 \cdot r_{O_2}^{ads} - r_{CO} - r_{H_2} + r_{H_2O}^{ads} \qquad \text{(Formula 13)}$$

$$\frac{\partial \Theta_{[CO]}}{\partial t} = \eta \cdot (r_{CO}^{ads} - r_{CO}^{oxi}) \qquad \text{(Formula 14)}$$

If the proportions by mass $w_x$ of the exhaust gas components from the input emission model 50 are known, these two differential equations can be solved in the model 60, and the relationship that the number of unoccupied storage sites corresponds to the number of available storage sites reduced by the number of storage sites occupied by oxygen and by carbon monoxide can be used to model the number of storage sites occupied by carbon monoxide as rich gas component. In the present working example, this is done in such a way that, in a first calculation step 61, the calculations for the first zone 21 are first conducted, then, in a second calculation step 62, the calculation for the second zone 22 is conducted, and then the results of the two calculation steps 61, 62 are combined 63, in order thus to obtain the overall proportion of the storage sites of the exhaust gas catalytic converter 20 occupied by rich gas components.

The input emission model 50 is adapted to remedy uncertainties by further taking account of the sensor signal of the second lambda probe 32 in the input emission model 59. The model 60 of the occupation of the storage sites can also be adapted by taking account of the signal of the lambda probe 32 in the model 60.

The invention claimed is:

1. A method of controlling an internal combustion engine with an exhaust gas catalytic converter (20), the method comprising:
    modelling occupation of storage sites of the exhaust gas catalytic converter (20) with rich gas components;
    recognizing deactivation from a proportion of the occupied storage sites in a total number of storage sites when a gradient of the proportion of the occupied storage sites at least for a settable period of time exceeds a gradient threshold (42); and
    initiating reactivation by actuation of the internal combustion engine,
    wherein, by means of an input lambda probe upstream of the exhaust gas catalytic converter and an input emission model (50) of the exhaust gas catalytic converter (20), proportions by mass of oxygen, hydrogen, water and the rich gas components of the exhaust gas upstream of the exhaust gas catalytic converter are ascertained (50),
    wherein the proportions by mass are ascertained without the use of an output lambda probe downstream of the catalytic converter.

2. The method according to claim 1, wherein, for the reactivation, the internal combustion engine is actuated such that it produces a lean exhaust gas.

3. The method according to claim 1, wherein the reactivation is ended when the proportion of the occupied storage sites goes below a given threshold or the output lambda probe downstream of the exhaust gas catalytic converter (20) indicates a lean exhaust gas having a lambda value of more than 1.

4. The method according to claim 1, wherein the modeling (60) takes account of adsorption of gaseous rich gas components at the storage sites and oxidation of adsorbed rich gas components.

5. The method according to claim 1, wherein the modeling (60) takes account of occupation of the storage sites of the exhaust gas catalytic converter with oxygen.

6. The method according to claim 5, wherein the occupation of the storage sites of the exhaust gas catalytic converter with oxygen is ascertained by taking account of adsorption of gaseous oxygen at the storage sites, oxidation of gaseous rich gas components with adsorbed oxygen, oxidation of gaseous hydrogen with adsorbed oxygen, and breakdown of gaseous water and adsorption of the oxygen released.

7. The method according to claim 1, wherein the modeling (60) involves dividing the exhaust gas catalytic converter (20) into multiple zones (21, 22) in axial succession.

8. A non-transitory, computer-readable storage medium containing instructions which when executed on a computer cause the computer to recognize deactivation of an exhaust gas catalytic converter and to control an internal combustion engine by
    modelling occupation of storage sites of the exhaust gas catalytic converter (20) with rich gas components;
    recognizing deactivation from a proportion of the occupied storage sites in a total number of storage sites when a gradient of the proportion of the occupied storage sites at least for a settable period of time exceeds a gradient threshold (42); and
    initiating reactivation by actuation of the internal combustion engine,
    wherein, by means of an input lambda probe upstream of the exhaust gas catalytic converter and an input emission model (50) of the exhaust gas catalytic converter (20), proportions by mass of oxygen, hydrogen, water and the rich gas components of the exhaust gas upstream of the exhaust gas catalytic converter are ascertained (50),
    wherein the proportions by mass are ascertained without the use of an output lambda probe downstream of the catalytic converter.

9. An electronic control device (30) set up to recognize deactivation of an exhaust gas catalytic converter (20) and to control an internal combustion engine, the electronic control device comprising:
    an electronic processor configured to
        model occupation of storage sites of the exhaust gas catalytic converter (20) with rich gas components;
        recognize deactivation from a proportion of the occupied storage sites in a total number of storage sites when a gradient of the proportion of the occupied storage sites at least for a settable period of time exceeds a gradient threshold (42); and
        initiate reactivation by actuation of the internal combustion engine,
    wherein, by means of an input lambda probe upstream of the exhaust gas catalytic converter and an input emission model (50) of the exhaust gas catalytic converter (20), proportions by mass of oxygen, hydrogen, water and the rich gas components of the exhaust gas upstream of the exhaust gas catalytic converter are ascertained (50),
    wherein the proportions by mass are ascertained without the use of an output lambda probe downstream of the catalytic converter.

* * * * *